Aug. 23, 1966

M. ALTERMATT 3,267,517

APPARATUS FOR MOLDING HARDENABLE PLASTICS IN A VACUUM

Original Filed Nov. 9, 1961

Inventor:
Max Altermatt
by Michael J. Striker ical and not fixed. the material according to the invention with the mold is not going to release the shrinkage.

United States Patent Office 3,267,517
Patented August 23, 1966

3,267,517
APPARATUS FOR MOLDING HARDENABLE PLASTICS IN A VACUUM
Max Altermatt, Zullwill 54A, Solothurn, Switzerland
Original application Nov. 9, 1961, Ser. No. 151,262. Divided and this application May 18, 1964, Ser. No. 368,182
Claims priority, application Austria, Nov. 15, 1960, A 8,490/60
8 Claims. (Cl. 18—5)

This application is a division of my copending patent application Serial No. 151,262, filed November 9, 1961, entitled "Process and Apparatus for Molding Hardenable Plastics in a Vacuum," and now abandoned.

The present invention relates to an apparatus for molding hardenable plastics in a vacuum, particularly for hardenable synthetic resins. The apparatus proposed according to the invention permits to introduce the plastic initially under atmospheric pressure and then under superatmospheric pressure into the evacuated mold. This has manifold advantages. Because the plastic members concerned are generally reinforced, the immediate admission of superatmospheric pressure would involve the danger that the reinforcement is displaced under the action of the plastic introduced under pressure and such displacements might adversely affect the strength of the plastic member. On the other hand, if the superatmospheric pressure is not admitted until the resin has gelled, the reinforcement will have been substantially located so that the supply of plastic or resin under pressure cannot change the position of the reinforcement. Another advantage resides in that any shrinkage of the synthetic resin during gelling can be entirely compensated. It is also possible to use relatively high vacua, which may have a value of about $2-3 \times 1^{-10}$ mm. mercury, without resulting in foaming or boiling of the resin during its introduction into the vacuum chamber. This contributes also to a particularly high degree of packing of the mold so that dense plastic members free from shrinkage holes are obtained. In order to ensure that the plastic gels immediately when it is introduced into the mold, the latter is suitably preheated.

To avoid technical difficulties in using the apparatus, it has proved desirable to close the mold after a reinforcement for the plastic has been introduced into it and before the mold is placed into an evacuating vessel and the plastic inlet opening is simultaneously connected to a plastic feed pipe. The closed mold supported on a spring bottom of the movable base of the vacuum vessel is then sealingly engaged with the stationary top of the vacuum vessel by lifting the movable base.

The apparatus according to the present invention preferably comprises a composite vacuum vessel having a stationary top and a movable base provided with a spring bottom, the top being connected to a vacuum pump, an air conduit and by means of a feed pipe to a reservoir for plastic, which in this reservoir can be seelctively subjected to the action of the atmosphere or of compressed gases, preferably compressed air.

Further details and advantages of the invention will be described with reference to an example. The drawing shows apparatus for carrying out the process. Consecutive figures correspond to consecutive phases of the process according to the invention.

Figure 1:
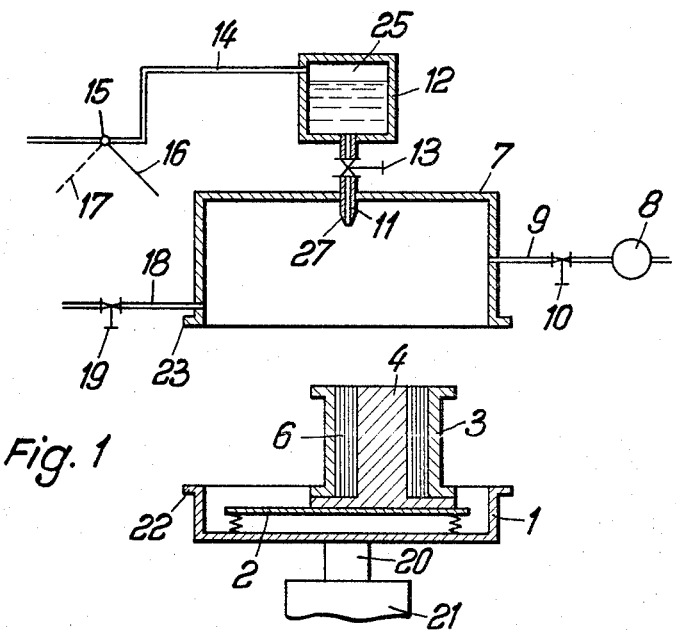
FIG. 1 shows the parts in the position obtained when the reinforcement has already been introduced into the mold.
Figure 2:
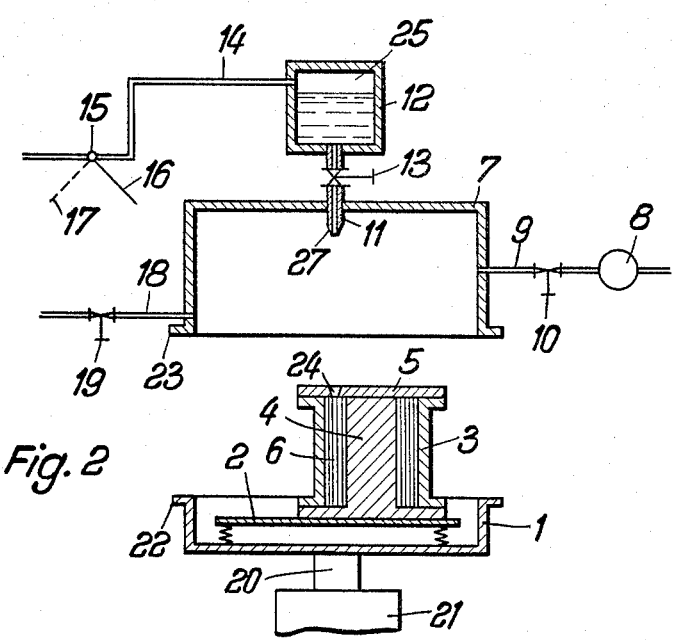
FIG. 2 shows the apparatus after the cover has been placed on the heated mold, which contains the reinforcement.

FIG. 1 shows the lowered base 1 of the vacuum vessel. This base carries on its spring bottom 2 the mold 3, which is also composite. In addition to the abovementioned base 3 it comprises a core member 4 and a cover 5 (FIG. 2). The reinforcement 6 has already been introduced into the cavity of the mold, which is to be used to make the plastic member. The top 7 of the vacuum vessel is also shown. This top is stationary. It is connected to the vacuum pump 8 by the conduit 9 incorporating a valve 10. Further connected to the top is a plastic feed pipe 11, which is connected by the valve 13 to the reservoir vessel 12. The conduit 14 is connected to the upper part of the plastic reservoir 12. The conduit 14 incorporates a valve 15, the operating lever of which can be moved to two positions, namely, to position 16 shown in solid lines, in which the conduit 14 communicates with the atmosphere, whereas in position 17 shown in dotted lines the valve 15 is connected to a source of pressure gas, e.g., a compressed air container. A venting line 18 containing a valve 19 is also provided.

When the parts are in the position shown in FIG. 1, the mold 3, 4 has already been preheated. Immediately thereafter the parts assume the position shown in FIG. 2, in which the mold 3, 4 is closed by the cover 5. The base 1 of the vacuum device has not moved until that time. This means that the ram 20 of a preferably pneumatic or hydraulic jack 21 has not been moved from the position of FIG. 1.

Figure 3:
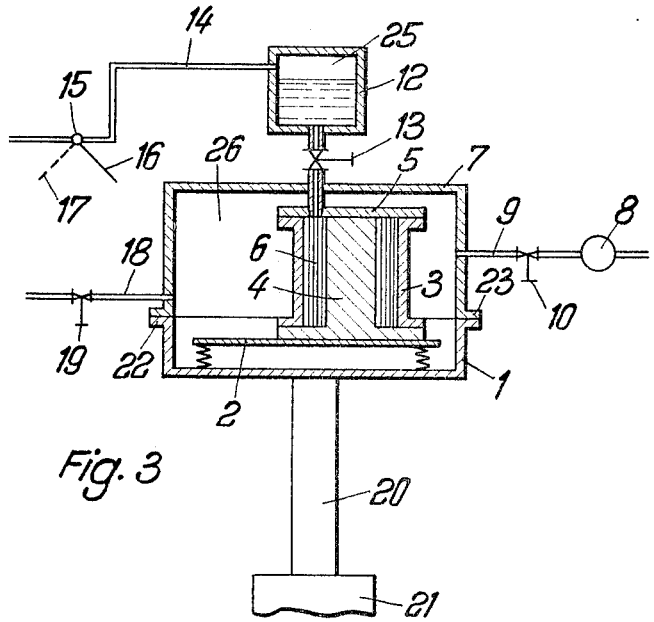
FIG. 3 shows the position of the parts after the vacuum vessel has been closed and the mold cavities have been connected to the plastic reservoir, i.e., during the evacuation.
Figure 4:
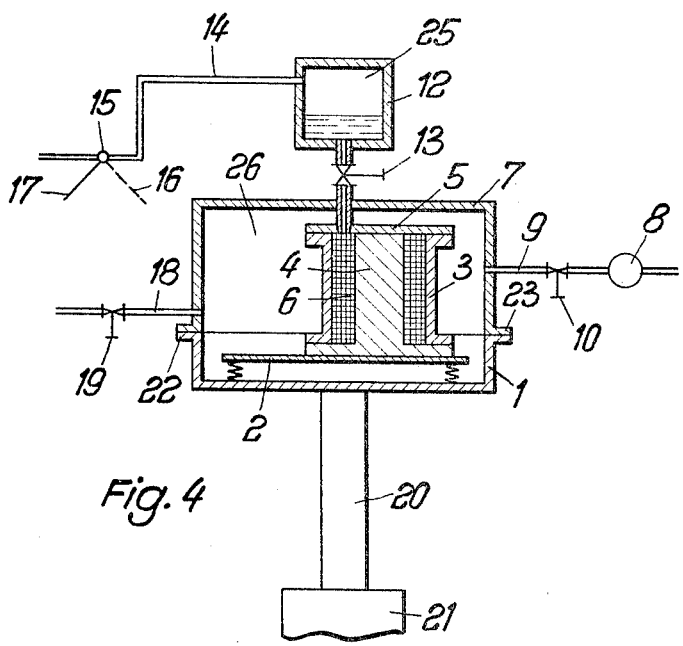
FIG. 4 shows the apparatus after the mold cavities have been filled whereas the vacuum vessel is still closed.

This has been the case in FIG. 3. It is apparent that the ram 20 and with it the base 1 of the vacuum device have been lifted. As a result, the ground rim 22 of the base 1 has sealingly engaged the rim 23 of the top 7 of the vacuum device. The seal may be improved by an inserted packing. The conical opening 24 of the cover 5 (FIG. 2) has received the conical mouthpiece 27 of the feed pipe 11 connected to the synthetic resin reservoir 12. The valves 13 and 19 are still closed and the valve 15 is in position 16, in which the space 25 above the synthetic resin supply communicates with the atmosphere. In the position of the parts shown in FIG. 3, the valve 10 is opened. At the same time the vacuum pump 8 is started. The evacuation begins in the vacuum vessel 1, 7 in the space 26, which is sealed from the atmosphere. The evacuation is continued until the desired vacuum has been reached. As soon as the vacuum has been reached, the pump 8 is started and the valve 10 is closed. Since the cover 5 acts like a check valve, the vacuum has been transmitted to the space 6. When the device is in this state, the valve 13 is opened to permit synthetic resin to flow into the cavities 6 of the mold 3, 4 without foaming or boiling of the resin fed. Since the mold parts 3 4 are preheated, the resin gels immediately. Because the parts 3, 4 have or are designed to provide a high heat capacity, this gelling is effected to a sufficiently high degree. As soon as gelling to the required degree has occurred, which can be found by experience, the valve 15 is moved from position 16 into position 17. As a result, compressed gas can enter the space 25 and the mold cavities 6 are now filled up with plastic under pressure. Any shrinkage of the synthetic resin which may have occurred is thus entirely compensated and the mold is so completely filled with synthetic resin that shrinkage holes, cavities or other irregularities cannot be formed.

Figure 5:
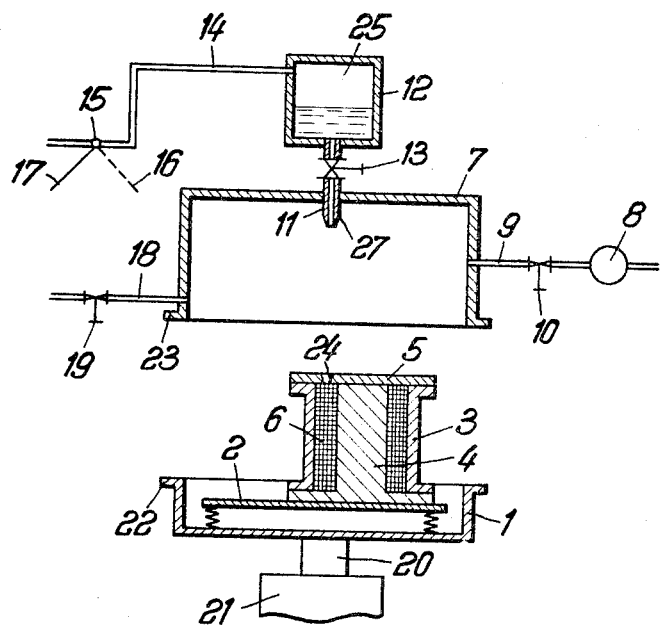
FIG. 5 shows the apparatus with the vacuum vessel opened.

An entirely firm and homogeneous plastic member is obtained, which can be removed from the mold 3, 4 as soon as the apparatus has reached the condition shown in FIG. 5. Previously the valve 19 has been opened to admit air to the space 26. Then the ram 20 and with it the base 1 of the vacuum vessel 1, 3 have been lowered so that the parts of the apparatus have assumed the position shown in FIG. 5. In this position the desired plastic member will be obtained when the cover 5 is removed.

Figure 6:
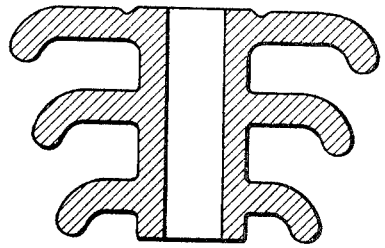
FIG. 6 shows an example of a plastic member which is made according to the present invention with an exactly positioned reinforcement, not shown.

The new apparatus enables the manufacture of very complicated plastic members such as are shown, e.g., in FIG. 6, without any displacements or other irregularities. The reinforcements are exactly in the position prescribed for them in the drawing. The mold cavities are completely filled with plastic and the members have also the shape prescribed for them in the drawing.

What is claimed is:

1. Apparatus for molding articles of hardenable plastic in a vacuum comprising, in combination, a composite vacuum vessel having a stationary part and a movable part movable toward and away from said stationary part, each of said parts having an end face parallel to and facing the end face of the other part; a vacuum pump; a first conduit extending between and providing communication between said vacuum pump and the interior of said stationary part; a shut-off valve in said first conduit; a reservoir for plastic; a second conduit extending between and providing communication between said reservoir for plastic and said stationary part, said second conduit having an end portion projecting into the interior of said stationary part; a shut-off valve in said second conduit; means operatively connected to said reservoir for plastic for venting and pressurizing the interior thereof; a composite mold disposed in said movable part of said vacuum vessel and having walls defining a mold cavity corresponding to the shape of the article to be manufactured, one of said walls of said mold facing said stationary part being formed with an opening communicating with said cavity and aligned with said end portion of said second conduit and having a shape adapted to sealingly receive said end portion; and moving means cooperating with said movable part for moving the latter in a direction transverse to said end face thereof between a closed position in which the end face of said movable part sealingly engages the end face of said stationary part, and an open position in which said end faces are spaced apart from each other a distance sufficient to permit removal of said mold in lateral direction from the interior of the open composite vacuum vessel, said end portion of said second conduit being spaced from said end face of said stationary part a distance so that said end portion sealingly engages in said opening when said end face of said movable part sealingly engages said end face of said stationary part and said movable part is in said closed position.

2. Apparatus as set forth in claim 1, said means for venting and pressurizing the interior of the reservoir for plastic comprising a conduit, a two-way valve in said conduit to selectively connect the reservoir to atmosphere and to a source of superatmospheric pressure.

3. Apparatus as set forth in claim 1, said stationary part of the vacuum vessel forming the top of the vacuum vessel, said movable part of the vacuum vessel forming the base of the vacuum vessel.

4. Apparatus as set forth in claim 1, said means for moving said movable part of the vacuum vessel comprising a piston-cylinder arrangement, the piston of which is operable by a controlled pressure fluid.

5. Apparatus for molding articles of hardenable plastic in a vacuum comprising, in combination, a composite vacuum vessel having a stationary part and a movable part movable toward and away from said stationary part, each of said parts having an end face parallel to and facing the end face of the other part; a vacuum pump; a first conduit extending between and providing communication between said vacuum pump and the interior of said stationary part; a shut-off valve in said first conduit; a reservoir for plastic; a second conduit extending between and providing communication between said reservoir for plastic and said stationary part, said second conduit having an end portion projecting into the interior of said stationary part; a shut-off valve in said second conduit; means operatively connected to said reservoir for plastic for venting and pressurizing the interior thereof; a composite mold disposed in said movable part of said vacuum vessel and having walls defining a mold cavity corresponding to the shape of the article to be manufacture, one of said walls of said mold facing said stationary part being formed with an opening communicating with said cavity and aligned with said end portion of said second conduit; moving means cooperating with said movable part for moving the latter in a direction transverse to said end face thereof between a closed position in which the end face of said movable part sealingly engages the end face of said stationary part, and an open position in which said end faces are spaced apart from each other a distance sufficient to permit removal of said mold in lateral direction from the interior of the open composite vacuum vessel, said end portion of said second conduit projecting into the interior of said stationary part a distance so that said end portion sealingly engages in said opening when said movable part is in said closed position; and resilient supporting means in said movable part resiliently supporting said composite mold in such a manner so that said end portion of said second conduit engages in said opening of said one wall before said moving means moves said movable part to the fully closed position and so that said end portion is fluid-tightly pressed into said opening when said movable part is in said closed position.

6. Apparatus for molding articles of hardenable plastic in a vacuum comprising, in combination, a composite vacuum vessel having a stationary part and a movable part movable toward and away from said stationary part, each of said parts having an end face parallel to and facing the end face of the other part; a vacuum pump; a first conduit extending between and providing communication between said vacuum pump and the interior of said stationary part; a shut-off valve in said first conduit; a reservoir for plastic; a second conduit extending between and providing communication between said reservoir for plastic and said stationary part, said second conduit having an end portion projecting into the interior of said stationary part and having a frustoconical outer surface; a shut-off valve in said second conduit; means operatively connected to said reservoir for plastic for venting and pressurizing the interior thereof; a composite mold disposed in said movable part of said vacuum vessel and having walls defining a mold cavity corresponding to the shape of the article to be manufacture, one of said walls of said mold facing said stationary part being formed with an opening defined by a frustoconical inner surface, communicating with said cavity and aligned with said end portion of said second conduit; moving means cooperating with said movable part for moving the latter in a direction transverse to said end face thereof between a closed position in which the end face of said movable part sealingly engages the end face of said stationary part, and on open position in which said end faces are spaced apart from each other a distance sufficient to permit removal of said mold in lateral direction from the interior of the open composite vacuum vessel, said end portion of said second conduit projecting into the interior of said stationary part a distance so that said end portion sealingly engages in said opening when said movable part is in said closed position; and resilient supporting means in said movable part resiliently supporting said composite mold in such a manner so that said end portion of said second conduit engages in said opening of said one wall before said moving means moves said movable part to the fully closed position and so that said frustoconical outer surface of said end portion is fluid-tightly pressed against said frustoconical inner surface defining said opening when said movable part is in said closed position.

7. Apparatus for molding articles of hardenable plastic in a vacuum comprising, in combination, a composite vacuum vessel having a stationary part and a movable part movable toward and away from said stationary part, each of said parts having an end face parallel to and facing the end face of the other part; a vacuum pump; a first conduit extending between and providing communication between said vacuum pump and the interior of said stationary part; a shut-off valve in said first conduit; a reservoir for plastic; a second conduit extending between and providing communication between said reservoir for plastic and said stationary part, said second conduit having an end portion projecting into interior of said stationary part; a shut-off valve in said second conduit; means operatively connected to said reservoir for plastic for venting and pressurizing the interior thereof; a composite mold disposed in said movable part of said vacuum vessel and having walls defining a mold cavity corresponding to the shape of the article to be manufactured, one of said walls of said mold facing said stationary part being formed with an opening communicating with said cavity and aligned with said end portion of said second conduit; moving means cooperating with said movable part for moving the latter in a direction transverse to said end face thereof between a closed position in which the end face of said movable part sealingly engages the end face of said stationary part, and an open position in which said end faces are spaced apart from each other a distance sufficient to permit removal of said mold in lateral direction from the interior of the open composite vacuum vessel, said end portion of said second conduit projecting into the interior of said stationary part a distance so that said end portion sealingly engages in said opening when said movable part is in said closed position; and a spring bottom in said movable part and supporting said composite mold in such a manner so that said end portion of said second conduit engages in said opening of said one wall before said moving means moves said movable part to the fully closed position and so that said end portion is fluid-tightly pressed into said opening when said movable part is in said closed position.

8. Apparatus for molding articles of hardenable plastic in a vacuum comprising, in combination, a composite vacuum vessel including a substantially cup-shaped stationary part having a peripheral wall, an end wall integral with and extending across one end of said peripheral wall, and an annular flange projecting radially outwardly from the other end of said peripheral wall, said flange having a plane end face facing away from said end wall, said vessel further comprising a movable part having a peripheral wall, an end wall integral with and extending across one end of said peripheral wall of said movable part and an annular flange projecting outwardly from the other end of the peripheral wall of said movable part and having an end face parallel to and facing said end face of said stationary part; a vacuum pump; a first conduit extending between and providing communication between said vacuum pump and the interior of said stationary part; a shut-off valve in said first conduit; a reservoir for plastic material; a second conduit extending between and providing communication between said reservoir for plastic and said stationary part, said second conduit having an end portion extending through said end wall of said stationary part into the latter and having an outer frustoconical surface; a shut-off valve in said second conduit; means operatively connected to said reservoir for plastic for venting and pressurizing the interior thereof; a composite mold arranged in said movable part of said vacuum vessel and having walls defining a mold cavity corresponding to the shape of the article to be manufactured, one of said walls of said mold facing said end wall of said stationary part being formed with an opening communicating with said cavity and axially aligned with said end portion of said second conduit, said opening being defined by a frustoconical inner surface; moving means cooperating with said movable part for moving the latter in a direction transverse to said end face of said flange thereof between a closed position in which the end face of said movable part sealingly engages the end face of said stationary part, and an open position in which said end faces are spaced apart from each other a distance sufficient to permit removal of said mold in lateral direction from the interior of the open composite vessel; and supporting means in said movable part for supporting said composite mold therein, said supporting means comprising a plate spaced from said end wall of said movable part and a plurality of compression springs sandwiched between said plate and said end wall of said movable part so that said mold is resiliently supported on said end wall of said movable part, said end portion of said second conduit projecting into the interior of said stationary part a distance so that said end portion will engage said inner surface of said opening before said composite vessel is fully closed, whereby during complete closing of said composite vessel said plate will resiliently yield toward said end wall of said movable part compressing thereby said compression springs so that the frustoconical outer surface of said end portion will be pressed with increasing pressure against said frustoconical inner surface of said opening.

References Cited by the Examiner
UNITED STATES PATENTS

| | | | |
|---|---|---|---|
| 2,461,723 | 2/1949 | Cowan | 18—30 |
| 2,876,492 | 3/1959 | Frieder et al. | |
| 3,081,492 | 3/1963 | Grzegorczyk. | |
| 3,103,698 | 9/1963 | Wollett | 18—5 |

J. SPENCER OVERHOLSER, *Primary Examiner.*

MICHAEL V. BRINDISI, WILLIAM J. STEPHENSON, J. H. FLINT, *Assistant Examiners.*